(12) United States Patent
Pora et al.

(10) Patent No.: US 11,867,076 B2
(45) Date of Patent: Jan. 9, 2024

(54) SYSTEM FOR LUBRICATING AN AERONAUTICAL ENGINE

(71) Applicant: SAFRAN AIRCRAFT ENGINES, Paris (FR)

(72) Inventors: Loic Pora, Moissy-Cramayel (FR); Huguette De Wergifosse, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 231 days.

(21) Appl. No.: 17/595,473

(22) PCT Filed: May 18, 2020

(86) PCT No.: PCT/FR2020/050821
§ 371 (c)(1),
(2) Date: Nov. 17, 2021

(87) PCT Pub. No.: WO2020/240112
PCT Pub. Date: Dec. 3, 2020

(65) Prior Publication Data
US 2022/0213806 A1    Jul. 7, 2022

(30) Foreign Application Priority Data
May 24, 2019    (FR) ...................................... 1905516

(51) Int. Cl.
*F01D 25/18*    (2006.01)
*F01M 1/02*    (2006.01)
(Continued)

(52) U.S. Cl.
CPC ............... *F01D 25/18* (2013.01); *F01M 1/02* (2013.01); *F01M 1/12* (2013.01); *F01M 1/16* (2013.01);
(Continued)

(58) Field of Classification Search
CPC ........... F01D 25/18; F01D 25/20; F01M 1/02; F01M 1/12; F01M 1/16; F01M 11/0004;
(Continued)

(56) References Cited

U.S. PATENT DOCUMENTS 2,571,166 A * 10/1951 Rossetto .................. F01D 25/18
184/6.11
3,045,420 A *  7/1962 Addie ....................... F01M 7/00
123/41.15
(Continued)

FOREIGN PATENT DOCUMENTS

| DE | 102014204641 A1 * | 9/2015 | ......... F16H 57/0441 |
| DE | 102015006176 A1 * | 12/2015 | .............. F01L 1/344 |
| WO | 2013/169313 A1 | 11/2013 | |

OTHER PUBLICATIONS

International Search Report and Written Opinion received for PCT Patent Application No. PCT/FR2020/050821, dated Nov. 2, 2020, 15 pages (6 pages of English Translation and 9 pages of Original Document).

*Primary Examiner* — Michael A Riegelman
(74) *Attorney, Agent, or Firm* — WOMBLE BOND DICKINSON (US) LLP

(57) ABSTRACT

The invention relates to a system (1) for lubricating an aeronautical engine (5) and a reduction gearbox (4) associated with the engine (5), the system (1) comprising an oil reservoir (2) feeding at least one first supply pump (3) supplying a first circuit (6) of the gearbox (4) opening into at least one chamber (4a) of the gearbox (4) and, in parallel, a second circuit (7) of the engine (5) opening into chambers (5a) of the engine (5). The second circuit (7) comprises a jet pump (9) of variable cross section supplied at least by the first supply pump (3), bypassing the first circuit (6), a second driven supply pump (10) being integrated into the second circuit (7) downstream of the jet pump (9), a portion of a
(Continued)

flow (Qp) in the first circuit (6) being drawn off by the jet pump (9) to supply the second circuit (7).

10 Claims, 5 Drawing Sheets

(51) Int. Cl.
  *F01M 1/12* (2006.01)
  *F01M 1/16* (2006.01)
  *F16H 57/04* (2010.01)
  *F01M 11/00* (2006.01)
(52) U.S. Cl.
  CPC ..... *F16H 57/0475* (2013.01); *F01M 11/0004* (2013.01); *F01M 2001/0246* (2013.01); *F01M 2001/0253* (2013.01); *F01M 2001/123* (2013.01); *F16H 57/0441* (2013.01)
(58) Field of Classification Search
  CPC ...... F01M 2001/0253; F01M 2001/123; F16H 57/0441; F16N 13/00; F16N 2013/006; F16N 7/38; F16N 7/40
  See application file for complete search history.

(56) References Cited

U.S. PATENT DOCUMENTS

| | | | | |
|---|---|---|---|---|
| 4,431,372 | A * | 2/1984 | Dadhich | F01D 25/20 184/6.28 |
| 5,615,547 | A * | 4/1997 | Beutin | F02C 7/14 60/39.83 |
| 8,794,009 | B2 * | 8/2014 | Glahn | F01D 25/16 60/785 |
| 11,518,525 | B2 * | 12/2022 | Suciu | B64D 13/08 |
| 2010/0028127 | A1 * | 2/2010 | Cornet | F16N 7/385 184/6.11 |
| 2013/0192250 | A1 * | 8/2013 | Glahn | F02C 6/08 60/785 |
| 2022/0213806 | A1 * | 7/2022 | Pora | F01M 1/16 |

* cited by examiner

[Fig.1]
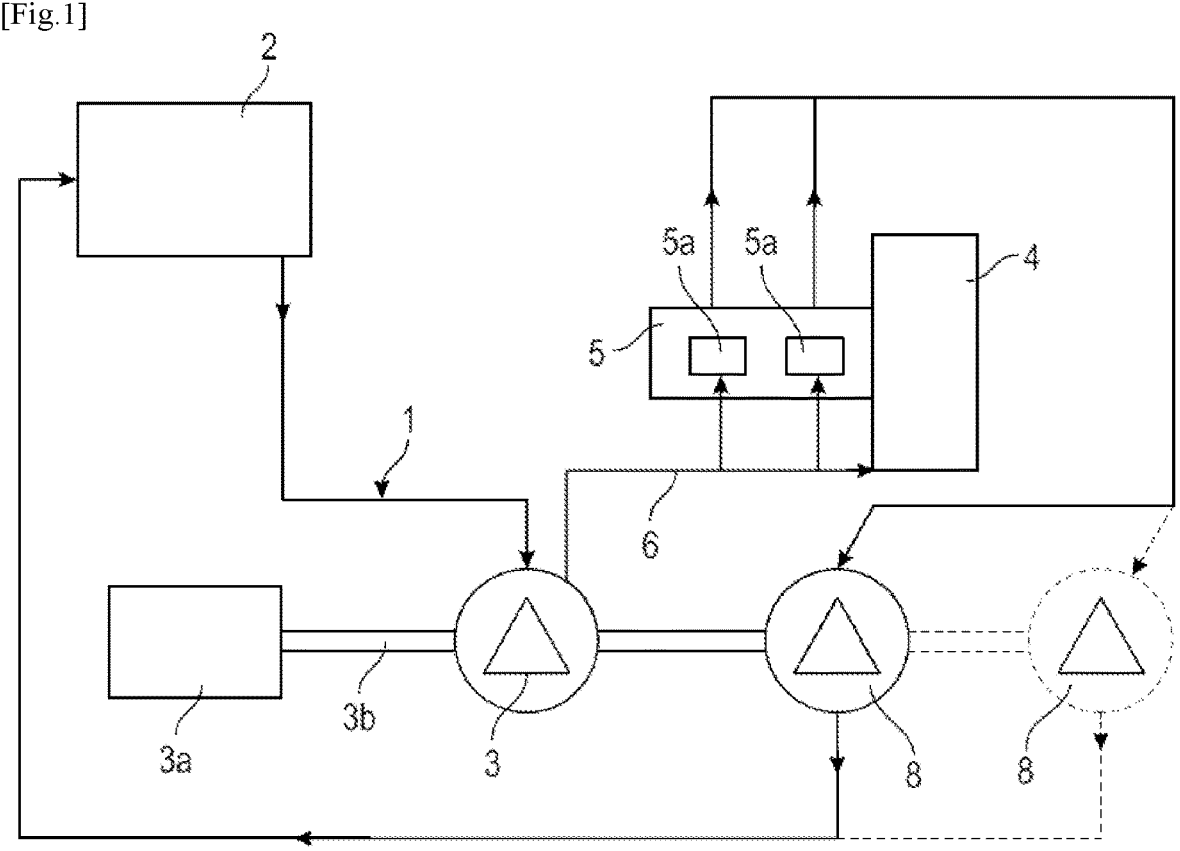

[Fig.2]
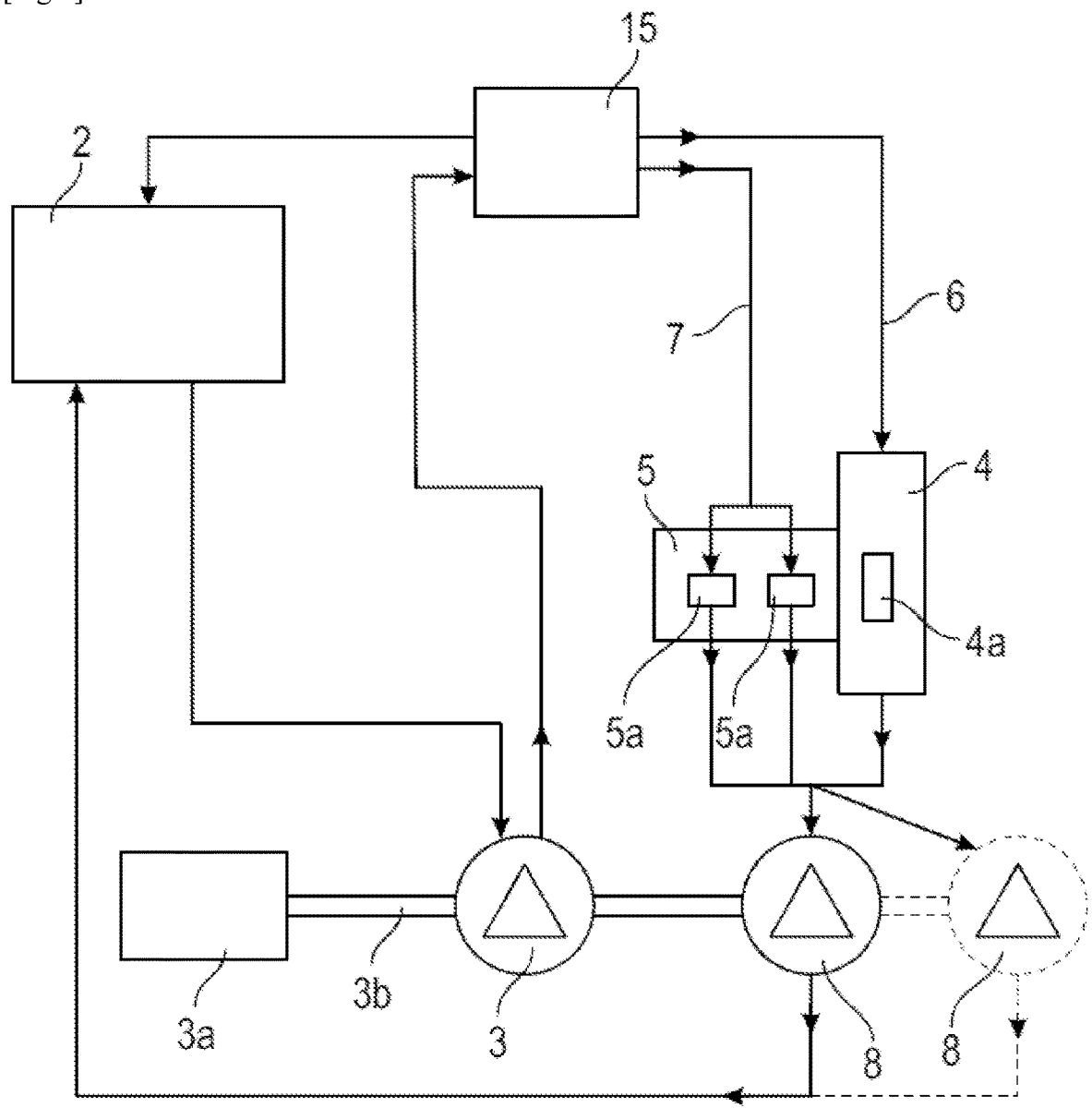

[Fig.3]
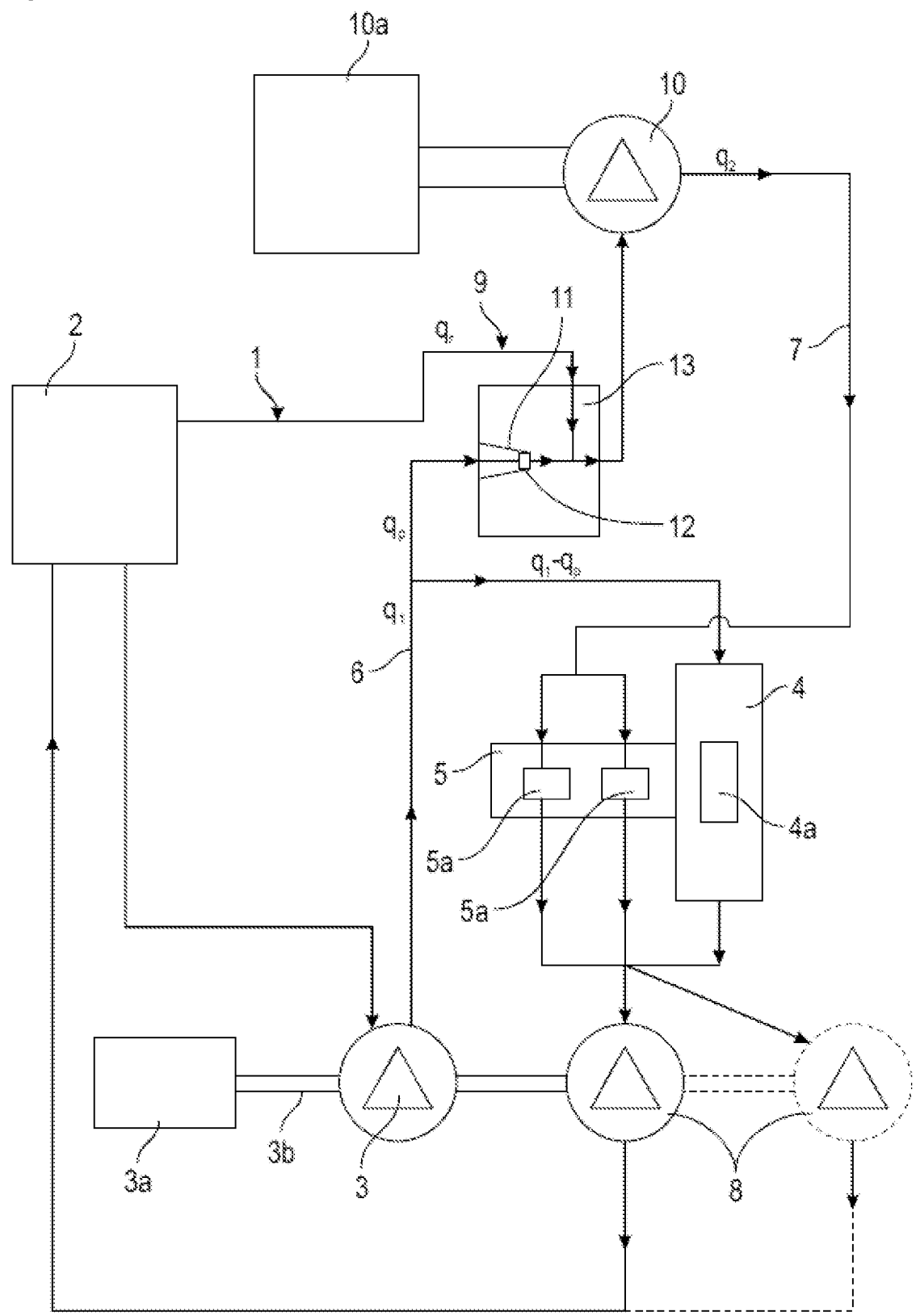

[Fig.4]
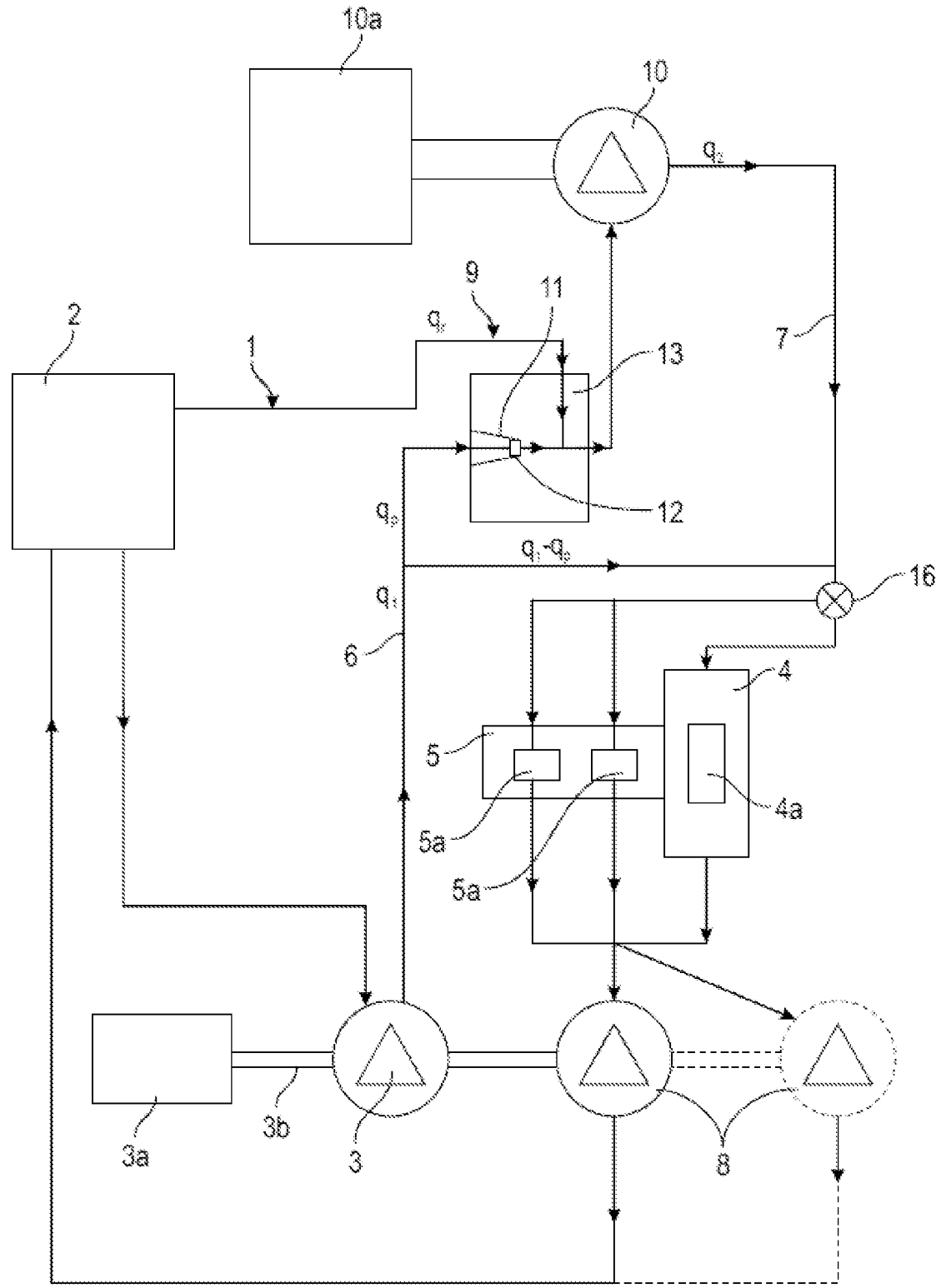

[Fig.5]
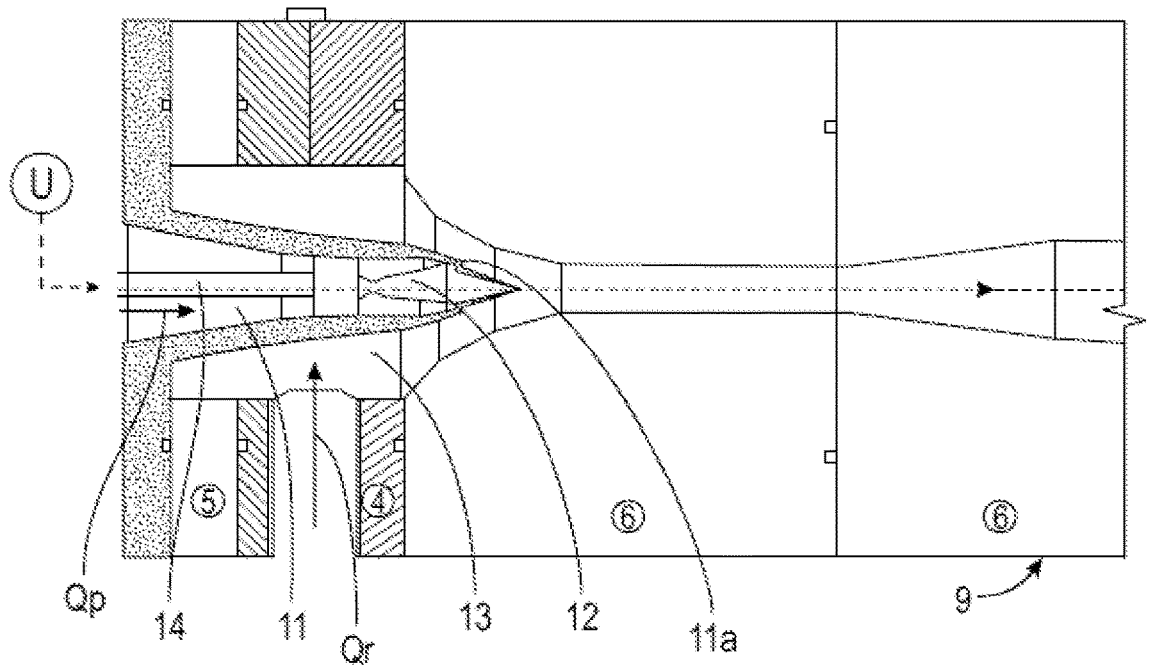
[Fig.6]
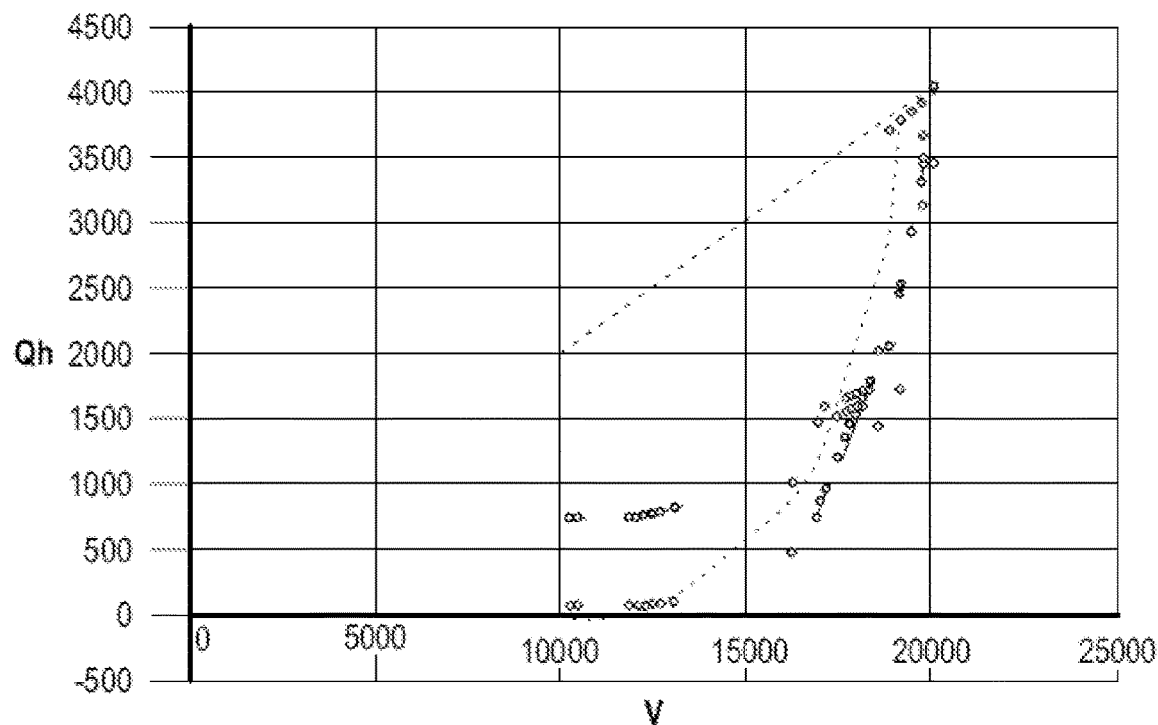

SYSTEM FOR LUBRICATING AN AERONAUTICAL ENGINE

TECHNICAL FIELD OF THE INVENTION

The present invention relates to a hydromechanical system for regulating the lubricating oil of a turbomachine.

BACKGROUND

The technical background comprises in particular the documents US-A1-2010/028127, U.S. Pat. No. 2,571,166 and WO-A1-2013/169313.

The aircraft turbojet or aeronautical engines are equipped with an oil system in order to ensure a lubrication of the various enclosures of the aeronautical engine and, where appropriate, in a reducer or reduction gearbox.

FIG. 1 shows a first embodiment of a system 1 for lubricating an aeronautical engine 5 according to a first prior art.

A lubricating oil reservoir 2 supplies at least a first supply pump 3 driven by first motorization means 3a by means of a drive shaft 3b. In this case, the oil flow rate is therefore proportional to the speed of the first motorization means 3a.

This oil flow rate is injected into enclosures 5a to be lubricated of the aeronautical engine 5 through a lubrication circuit 6, these enclosures 5a being drained by at least one recovery pump 8 which returns the drained and recovered oil to the oil reservoir 2.

A first recirculation pump 8 is shown as a solid line while a second recirculation pump 8 is shown as a dashed line to show that this second recirculation pump 8 may be absent or may be multiple with a number of recirculation pumps 8 greater than 2.

The supply pump or the supply pumps 3 and the recovery pumps 8 may be arranged on the same drive shaft 3b and thus be driven simultaneously by the first motorization means 3a.

Since a reduction gearbox is often attached to the aeronautical engine 5, in particular for driving auxiliary elements of the aeronautical engine 5, it is also necessary to ensure the lubrication of the elements of the reduction gearbox. This is particularly the case for an aeronautical engine 5 with a high bypass ratio.

FIG. 2 shows a second embodiment of a lubrication system 1 for an aeronautical engine 5 according to a second prior art with an oil circulation circuit 7 for the aeronautical engine 5 and the lubrication of its enclosures 5a and an oil circulation circuit 6 for a reduction gearbox 4 with at least one enclosure 4a.

This lubrication system 1, according to the second prior art, takes up characteristics of the first prior art, namely the presence of a lubricating oil reservoir 2 supplying at least one first supply pump 3 driven by first motorization means 3a by means of a transmission shaft 3b, these first motorization means 3a being able to be directly or indirectly connected to the reduction gearbox 4.

The lubrication system 1, according to the second prior art, also comprises one or more recirculation pumps 8 which return the oil flow rate to the oil reservoir 2, these recirculation pumps 8 being arranged on the same drive shaft 3b as the first supply pump 3 and thus being driven simultaneously.

The difference of this lubrication system 1 according to the second prior art with the first lubrication system 1 is that it comprises two separate lubrication circuits 6, 7 with a lubrication circuit 6 dedicated to the reduction gearbox 4 with at least one enclosure 4a and a lubrication circuit 7 dedicated to the aeronautical engine 5 and to the lubrication of the enclosures 5a contained in the aeronautical engine 5.

At the exit of the first supply pump 3, a conduit common to the first and second circuits 6, 7 opens to a four-way valve 15, forming the first way opening in this four-way valve 15.

A second outgoing way of the four-way valve 15 leads to the aeronautical engine 5 via the second lubrication circuit 7 for the lubrication of its enclosures 5a and a third outgoing way of the four-way valve 15 leads via the first lubrication circuit 6 to the reduction gearbox 4 for its lubrication of at least one enclosure 4a.

A fourth outgoing way of the four-way valve 15 returns to the lubricating oil reservoir 2.

The lubricating oil leaves the reduction gearbox 4 and the aeronautical engine 5 respectively, which are drained by the recovery pumps 8 that return the recovered oil to the oil reservoir 2. There may be one or more recovery pumps 8 specifically dedicated to the aeronautical engine 5 and the reduction gearbox 4, or the oil recovered from these two elements 4, 5 may be pooled and sent to the recirculation pumps 8.

The four-way valve 15 allow to perform a regulation of the flow rate of oil in different proportions sent to the aeronautical engine 5, the reduction gearbox 4 and the oil reservoir 2 for unused surplus oil.

The regulation of such a lubrication system is difficult to set up.

Thus, although it has the advantage of implementing a regulated lubrication of the aeronautical engine 5 and the reduction gearbox 4, the system 1 according to this second prior art is complex and bulky. This is because, in particular, a control of the four-way valve 15 and the distribution of the lubricating oil in the three outgoing ways is difficult to achieve.

Consequently, the problem at the basis of the invention is, in a system for lubricating by oil circulation of an aeronautical engine, in particular a turbomachine, also comprising a reduction gearbox, to carry out the lubrication of the aeronautical engine and of the reduction gearbox in a simple and effective manner by precisely dosing the quantity of oil to be sent respectively into the aeronautical engine and the reduction gearbox.

SUMMARY OF THE INVENTION

To this end, the present invention relates to a system for lubricating an aeronautical engine and a reduction gearbox associated with the aeronautical engine, the system comprising a lubricating oil reservoir feeding at least a first oil supply pump supplying a first lubrication circuit of the reduction gearbox opening into at least one lubrication enclosure of the reduction gearbox and, in parallel, a second lubrication circuit of the aeronautical engine opening into lubrication enclosures of the aeronautical engine, recirculation pumps at the exit of the aeronautical engine and of the reduction gearbox returning the oil to the oil reservoir, characterized in that the second circuit comprises a variable-section jet pump supplied at least by said at least one first supply pump bypassing the first circuit, a second driven supply pump being integrated into the second circuit downstream of the variable-section jet pump, a part of a flow rate in the first circuit being collected by the variable-section jet pump to supply the second circuit.

The present invention allows to carry out a simplified supply of lubricating oil in order to simplify the lubrication system by placing a variable-section jet pump between the first and second driven supply pumps in order to modulate the flow rate sucked into the reservoir by the variable-section jet pump.

The jet pump allows to retrieve the hydraulic energy by recovering a part of the lubricating oil at the exit of the first supply pump.

Advantageously, the variable-section jet pump is also supplied from the oil reservoir, a flow rate in the second circuit at the exit of the variable-section jet pump being the sum of the part of the flow rate collected from the first circuit by the variable-section jet pump with a flow rate coming from the oil reservoir via the variable-section jet pump.

Advantageously, the variable-section jet pump has a first chamber of truncated conical shape at the top, narrowing away from a mouth of the variable-section jet pump and receiving in its interior the part of the flow rate collected from the mouth, the first chamber being surrounded by a second chamber into which the oil from the oil reservoir opens, the first chamber opening into the second chamber via an outlet, internally housing a needle carried by one end of a rod movable along a length of the first chamber, a longitudinal displacement of the rod being controlled by an actuator, the needle obstructing to a greater or lesser extent the outlet of the first chamber depending on its position along the length of the first chamber. The opposite is possible: we can imagine a fixed needle, and a nozzle whose position can be varied, so that the needle/nozzle assembly varies the passage section.

In a first embodiment, the first and second lubrication circuits directly supply the aeronautical engine and the reduction gearbox respectively without merging.

This allows the flow rate to be regulated in the reduction gearbox and to have a conventional circuit on the side of the aeronautical engine and its enclosures.

The first supply pump or the first pumps, at the inlet of the first circuit, provide a flow rate proportional to the drive speed of the first supply pump or the first supply pumps, advantageously in relation to the reduction gearbox.

A second supply pump in the second circuit downstream of the variable-section jet pump has a flow rate running through it which proportional to the drive speed of the second supply pump.

The jet pump allows to take a part of the flow rate leaving the first supply pump or the first supply pumps to supply the second supply pump.

Thus, in a first embodiment of the invention, the flow rate going to the reduction gearbox may be equal to the flow rate of the first supply pump minus the flow rate collected by the variable-section jet pump.

Since the exit flow rate of the variable-section jet pump is set by the second supply pump in the second circuit, it is possible to calculate the flow rate sucked directly from the oil reservoir by the constant-section jet pump.

The knowledge of the different flow rates of the variable-section jet pump as well as the supply pressures allows to know the inlet pressure of the second supply pump of the second circuit, higher than the pressure of the reservoir.

An advantage of the present invention is that the energy created by the first supply pump or the first supply pumps of the first circuit and not used to lubricate the reduction gearbox will not be dissipated but will be used to discharge the second supply pump, this at the efficiency of the variable-section jet pump. A gain in power consumption is thus obtained.

In a second embodiment of the invention, the first and second lubrication circuits may merge downstream of the variable-section jet pump and then separate again at the level of a three-way valve with an inlet way common to the first and second circuits, a first exit on an extension of the second circuit to the aeronautical engine and a second exit on an extension of the first circuit to the reduction gearbox.

In this way, it is possible to obtain an overall flow rate in the first and second circuits, which are then combined before the overall flow rate is distributed to the reduction gearbox and the aeronautical engine by means of a three-way valve.

By connecting the exits of the first and second supply pumps in the first and second circuits respectively, the flow rate leaving to the three-way valve is equal to the flow rate from the first circuit plus the flow rate from the oil reservoir to the variable-section jet pump.

There is therefore an excess flow rate after the first and second circuits have been joined beyond a characteristic proportional to the drive speed of the first supply pump or the first supply pumps. It is the three-way valve which allows downstream to distribute the flow rates towards the reduction gearbox or the enclosures of the aeronautical engine.

Advantageously, said at least one first supply pump is arranged on a shaft driven directly or indirectly by the reduction gearbox as first motorization means.

Advantageously, the recirculation pumps at the exit of the aeronautical engine are arranged and driven on the shaft of said at least one first supply pump.

The present invention also relates to an assembly of an electronic control unit and a system for lubricating an aeronautical engine and a reduction gearbox associated with the aeronautical engine, characterized in that the system is as previously described, the electronic control unit incorporating means for calculating a respective oil flow rate in the second circuit to the aeronautical engine and in the first circuit to the reduction gearbox, the electronic control unit comprising means for controlling the opening of the variable-section jet pump so that the flow rate in the first circuit, after the variable-section jet pump has collected the part of the flow rate in the first circuit in order to supply the second circuit is equal to the calculated oil flow rate to the reduction gearbox and, the second pump being driven by second motorization means, the control unit comprising means for controlling a speed of rotation of the second motorization means of the second pump in order to ensure the calculated oil flow rate in the second circuit, or the electronic control unit incorporating means for controlling the three-way valve in order to ensure the calculated oil flow rate in the second circuit to the aeronautical engine and the calculated oil flow rate in the first circuit to the reduction gearbox.

The invention also concerns a turbomachine as an aeronautical engine comprising such an assembly of an electronic control unit and a lubrication system.

The present invention relates to a method for regulating a flow rate of lubricating oil in such a turbomachine, characterized in that a calculation is performed of the respective flow rates to the aeronautical engine and the reduction gearbox, the method implementing laws for controlling the variable-section jet pump and, where appropriate, the three-way valve so that the actual flow rates to the aeronautical engine and the reduction gearbox are respectively equal to the respective calculated flow rates.

It is thus possible to define a law for controlling the variable-section jet pump that allows at least a flow rate to the reduction gearbox to the right need.

In the first case, the flow rate going to the enclosures of the aeronautical engine remains equal to the flow rate of the second supply pump and therefore proportional to the rotational speed of the second supply pump, as was the case in the prior art.

It is possible to define the law for opening the variable-section jet pump allowing to have a flow rate as close as possible to the right need, without reaching the cavitation point in the jet pump.

Indeed, at high operating altitudes of the aeronautical engine, for example, low pressures can cause a localized vaporization of the oil in the form of bubbles which can then implode and damage the pumping elements. This phenomenon is called cavitation. This damage reduces the service life of the pumps.

Once the opening law of the variable-section jet pump has been implemented, the flow rate of each first or second circuit is calculated according to the driving speed of the first and second supply pumps respectively.

Such a right need regulation could be achieved with electrical machines. However, such an architecture was not advantageous in terms of mass, costs and development, compared to the potential gain of a regulation to the right need.

The method according to the present invention allows the economic implementation of a regulation of at least one flow rate to the right need, without modifying the lubrication circuit of the enclosures of the engine or reduction gearbox.

BRIEF DESCRIPTION OF FIGURES

Other characteristics, purposes and advantages of the present invention will become apparent from the following detailed description and from the attached drawings, which are given as non-limiting examples and in which:

FIG. 1 shows a lubrication system for an aeronautical engine according to a first prior art, FIG. 2 shows a lubrication system for an aeronautical engine and a reduction gearbox associated with the aeronautical engine according to a second prior art, FIG. 3 shows a lubrication system of an aeronautical engine and a reduction gearbox associated with the aeronautical engine according to a first embodiment of the present invention, FIG. 4 shows a lubrication system of an aeronautical engine and a reduction gearbox associated with the aeronautical engine according to a second embodiment of the present invention, FIG. 5 shows a cross-sectional view of a variable-section jet pump, enlarged from FIGS. 3 and 4, which variable-section jet pump can be implemented in a lubrication system according to the present invention, FIG. 6 shows four curves of an oil need and an oil flow rate estimate respectively for an aeronautical engine and a reduction gearbox, these curves resulting from an implementation of the regulating method in a lubrication system according to the present invention.

It should be kept in mind that the figures are given as examples and are not limiting of the invention. They are schematic representations of principle intended to facilitate the understanding of the invention and are not necessarily on the scale of the practical applications. In particular, the dimensions of the various elements illustrated are not representative of the reality, the aeronautical engine being illustrated as being smaller than it actually is in relation to a reduction gearbox.

DETAILED DESCRIPTION OF THE INVENTION

In what follows, reference is made to all the figures and in particular to FIGS. 3 to 5 taken in combination. Where reference is made to a specific figure or figures, these figures are to be taken in combination with the other figures for the recognition of the designated numerical references.

FIGS. 1 and 2 have already been described in the introductory part of this description.

Referring principally to FIGS. 3 and 4, the present invention relates to a system 1 for lubricating an aeronautical engine 5 and a reduction gearbox 4 associated with the aeronautical engine 5.

The lubrication system 1 comprises a lubricating oil reservoir 2 feeding at least a first supply pump 3 driven by first motorization means 3a.

The first supply pump 3 supplies at least partially a flow rate of oil, on the one hand, to a first lubrication circuit 6 of the reduction gearbox 4 opening into at least one lubrication enclosure 4a of the reduction gearbox 4 and, on the other hand, to a second lubrication circuit 7 of the aeronautical engine 5 opening into lubrication enclosures 5a of the aeronautical engine 5, the second circuit 7 being mounted as a bypass of the first circuit 6.

Recirculation pumps 8 at the exit of the aeronautical engine 5 and the reduction gearbox 4 return the oil to the oil reservoir 2. There may be two or more first supply pumps 3 and from one to ten or more recirculation pumps 8.

The recirculation pumps 8 may be common to ensure an oil recovery both at the exit of the aeronautical engine 5 and at the outlet of the reduction gearbox 4, or they may be separate between an exit of the aeronautical engine 5 and an exit of the reduction gearbox 4.

The first supply pump or the first supply pumps 3 of the first circuit 6, the recirculation pumps 8 and, where appropriate, a second supply pump 10 in the second circuit 7 may be positive displacement pumps.

According to the invention, the second circuit 7, just downstream of its separation from the first circuit 6 by bypass, comprises a variable-section jet pump 9 supplied at least by said at least one first supply pump 3 bypassing the first circuit 6.

The second circuit 7 also comprises a second supply pump 10, arranged downstream of the variable-section jet pump 9.

From the bypass of the second circuit 7 to the first circuit 6, a part of a flow rate Qp in the first circuit 6 is collected by the variable-section jet pump 9 to supply the second circuit 7.

In FIGS. 3 and 4, the flow rate in the first circuit 6 upstream of the first pump 3 is referenced Q1, the flow rate collected by the variable-section jet pump 9 is referenced Qp and the flow rate in the second circuit 7 is referenced Q2, being equal to the flow rate Qp collected by the variable-section jet pump 9 plus the flow rate Qr coming from the oil reservoir 2 and also passing through the variable-section jet pump 9.

In fact, the variable-section jet pump 9 can also be supplied from the oil reservoir 2. The flow rate Q2 in the second circuit 7 at the exit of the variable-section jet pump 9, regulated by the second pump 10, is thus the sum of the part of the flow rate Qp collected from the first circuit 6 by the variable-section jet pump 9 with the flow rate Qr coming from the oil reservoir 2 via the variable-section jet pump 9.

As can be seen in FIG. 5, the variable-section jet pump 9 may have a first chamber 11 forming a nozzle for introducing the part of the flow rate Qp collected into the variable-section jet pump 9.

This first chamber 11 may have a truncated conical shape at the top to present an outlet 11a. The conical shape may narrow away from a mouth of the variable-section jet pump 9 and receive therein the part of the flow rate Qp collected from the mouth to the outlet 11a pointing to an exit of the variable-section jet pump 9.

The variable-section jet pump 9 is an element which, by means of the Venturi effect, allows to pressurize, i.e. accelerate, the lubricating oil coming from the first circuit 6 and therefore at the inlet of the second circuit 7, the oil collected from the first circuit 6 being mixed with the oil coming directly from the oil reservoir 2.

The first chamber 11 may indeed be surrounded by a second chamber 13 into which the oil from the oil reservoir 2 opens to achieve the flow rate Qr coming from the oil reservoir 2. As a result, the oil coming from the oil reservoir 2 may not be subjected to the Venturi effect.

The first chamber 11 can open into the second chamber 13 through the opening 11a, which has a smaller cross-section in relation to the cross-section of the rest of the first chamber 11.

To provide a variable-section jet pump function, the first chamber 11 may internally house a needle 12 carried by one end of a rod 14 movable along a length of the first chamber 11.

A longitudinal displacement of the rod 14 can be initiated by an actuator remotely controlled by an electronic control unit U in order to increase or decrease the flow rate collected from the first circuit 6 facing a set flow rate to be reached in the first circuit 6 by removing the flow rate collected by the variable-section jet pump 9. However, this function could be done with a moving nozzle, as mentioned above.

To do this, the needle 12 more or less obstructs the outlet 11a of the first chamber 11 depending on its position in the length of the first chamber 11 and thus limits the flow rate collected from the first circuit 6 to a greater or lesser extent.

In a first embodiment of the system 1 according to the present invention, as shown in FIG. 3, the first and second lubrication circuits 6, 7 can directly supply the aeronautical engine 5 and the reduction gearbox 4 respectively without merging.

These first and second circuits 6, 7 are then separated and remain so until the aeronautical engine 5 and the reduction gearbox 4 respectively.

In a second embodiment of the system 1 according to the present invention, as shown in FIG. 4, the first and second lubrication circuits 6, 7 may merge downstream of the variable-section jet pump 9 and then separate again at the level of a three-way valve 16.

This three-way valve 16 may thus have an inlet way common to the first and second circuits 6, 7, a first exit on an extension of the second circuit 7 to the aeronautical engine 5 and a second exit on an extension of the first circuit 6 to the reduction gearbox 4.

Referring more particularly to FIGS. 3 and 4, the first supply pump or the first supply pumps 3 may be arranged on a shaft 3b driven directly or indirectly by the reduction gearbox 4, the reduction gearbox 4 or the interposed drive member acting as the first motorization means 3a.

The flow rate Q1 leaving the first supply pump or the first supply pumps 3 or flow rate of the first circuit 6 before collecting a part of the flow rate Qp by the variable-section jet pump 9 is then in correspondence with the speed of rotation of the reduction gearbox 4, which is very advantageous in order to have a flow rate of oil to the reduction gearbox 4 in adequacy with its operating parameters.

With respect to the recirculation pumps 8 at the exit of the aeronautical engine 5, these recirculation pumps 8 may also be arranged and driven on the shaft 3b of said at least one first supply pump 3, thus driven directly or indirectly by the reduction gearbox 4.

As illustrated in FIGS. 1 and 2, FIGS. 3 and 4 show two recirculation pumps 8, one of which is dotted to show that this number of two is not exhaustive and that there may be as well one recirculation pump as more than two recirculation pumps 8.

One of the main purposes of the present invention is to supply the aeronautical engine 5 and the reduction gearbox 4 with the always sufficient but just necessary amount of oil for their lubrication.

To this end, the present invention also relates to an assembly of an electronic control unit U and a system 1 for lubricating an aeronautical engine 5 and a reduction gearbox 4 associated with the aeronautical engine 5.

For a system 1 as previously described, the electronic control unit incorporates means for calculating a respective oil flow rate in the second circuit 7 to the aeronautical engine 5 and in the first circuit 6 to the reduction gearbox 4, so that they are fed with oil to right need, i.e. without too much oil and with enough oil according to their operating conditions.

In the first embodiment shown in FIG. 3, the electronic control unit, not shown in this figure, comprises means for controlling the opening of the variable-section jet pump 9 so that the flow rate Q1-Qp in the first circuit 6, after the variable-section jet pump 9 has collected the part of the flow rate Qp in the first circuit 6 to supply the second circuit 7, is equal to the calculated oil flow rate to the reduction gearbox 4.

Furthermore, as the second pump 10, integrated in the second circuit 7, is driven by second motorization means 10a, the control unit comprises means for controlling a speed of rotation of the second motorization means 10a of the second pump 10 in order to ensure the oil flow rate calculated in the second circuit 7 and sent to the aeronautical engine 5.

In the second embodiment shown in FIG. 4, the electronic control unit incorporates means for controlling the three-way valve 16 in order to ensure the calculated oil flow rate in the second circuit 7 to the aeronautical engine 5 and the calculated oil flow rate in the first circuit 6 to the reduction gearbox 4.

The invention also concerns a turbomachine as an aeronautical engine 5 comprising an assembly of an electronic control unit and a lubrication system 1 as previously described.

It may be necessary to estimate the impact of the ageing of the pumps in order to allow an accurate regulation during the service life of the pumps.

The present invention relates to a method for regulating a flow rate of lubricating oil in a turbomachine as described above with its lubrication system 1.

In this method, is performed a calculation of the respective flow rates to the aeronautical engine 5 and the reduction gearbox 4. The method then implements control laws for the variable-section jet pump 9 and, where appropriate, for the three-way valve 16 so that the actual flow rates to the aeronautical engine 5 and the reduction gearbox 4 are respectively equal to the respective calculated flow rates.

FIG. 6 shows two curves of need and of estimated flow rate sent for the lubrication, on the one hand, of a reduction gearbox and, on the other hand, of an aeronautical engine, the curves being in linear dotted lines for the two flow rate curves and in the form of a succession of points for the need curves, the points close to each other being connected by straight line segments for the requirement curve of the aeronautical engine in order to differentiate it from the requirement curve of the reduction gearbox, the points of which are not connected by segments.

The oil flow rate Qh is measured in liters per hour l/h for different speeds V in this FIG. 6. The speed V is the speed of the compressor shaft and of the HP turbine of the turbomachine, and is measured by a sensor and expressed in rpm.

The estimated flow rate curve sent to the enclosures of the aeronautical engine 5, which is the upper linear dashed curve in FIG. 6, is substantially identical to the flow rate obtained by lubrication systems 1 according to the prior art.

The curve of flow rate sent to the reduction gearbox, obtained by the implementation of a regulating method according to the present invention, this curve being the lower linear dotted curved curve in FIG. 6, is obtained as close as possible to the lubrication requirement curve of the reduction gearbox, this curve being formed by points not connected by segments in FIG. 6.

The invention is by no means limited to the described and illustrated embodiments which have been given only as examples.

The invention claimed is:

1. A system for lubricating an aeronautical engine and a reduction gearbox associated with the aeronautical engine, the system comprising a lubricating oil reservoir feeding at least a first oil supply pump supplying a first lubrication circuit of the reduction gearbox opening into at least one lubrication enclosure of the reduction gearbox and in parallel a second lubrication circuit of the aeronautical engine opening into lubrication enclosures of the aeronautical engine, recirculation pumps at the exit of the aeronautical engine and of the reduction gearbox returning the oil to the oil reservoir, wherein the second circuit comprises a variable-section jet pump supplied at least by said at least one first supply pump bypassing the first circuit, a second driven supply pump being integrated into the second circuit downstream of the variable-section jet pump, a part of a flow rate in the first circuit being collected by the variable-section jet pump to supply the second circuit.

2. The system according to claim 1, wherein the variable-section jet pump is also supplied from the oil reservoir, a flow rate (Q2) in the second circuit at the exit of the variable-section jet pump being the sum of the part of the flow rate (Qp) collected from the first circuit by the variable-section jet pump with a flow rate (Qr) coming from the oil reservoir via the variable-section jet pump.

3. The system according to claim 2, wherein the variable-section jet pump has a first chamber of truncated conical shape at the top, narrowing away from a mouth of the variable-section jet pump and receiving in its interior the part of the flow rate (Qp) collected from the mouth, the first chamber being surrounded by a second chamber into which the oil from the oil reservoir opens, the first chamber opening into the second chamber via an outlet, internally housing a needle carried by one end of a rod movable along a length of the first chamber, a longitudinal displacement of the rod being controlled by an actuator, the needle obstructing to a greater or lesser extent the outlet of the first chamber depending on its position along the length of the first chamber.

4. The system according to claim 1, wherein the first and second lubrication circuits directly supply the aeronautical engine and the reduction gearbox respectively without merging.

5. The system according to claim 1, wherein the first and second lubrication circuits merge downstream of the variable-section jet pump and then separate again at the level of a three-way valve with an inlet way common to the first and second circuits, a first exit on an extension of the second circuit to the aeronautical engine and a second exit on an extension of the first circuit to the reduction gearbox.

6. The system according to claim 1, wherein said at least one first supply pump is arranged on a shaft driven directly or indirectly by the reduction gearbox as first motorization means.

7. The system according to claim 6, wherein the recirculation pumps at the exit of the aeronautical engine are arranged and driven on the shaft of said at least one first supply pump.

8. An assembly of an electronic control unit and a system for lubricating an aeronautical engine and a reduction gearbox associated with the aeronautical engine, wherein the system is according to any of the preceding claims, the electronic control unit incorporating means for calculating a respective oil flow rate in the second circuit to the aeronautical engine and in the first circuit to the reduction gearbox,
the electronic control unit comprising means for controlling the opening of the variable-section jet pump so that the flow rate (Q1-Qp) in the first circuit, after the variable-section jet pump has collected the part of the flow rate (Qp) in the first circuit in order to supply the second circuit is equal to the calculated oil flow rate to the reduction gearbox and, the second pump being driven by second motorization means, the control unit comprising means for controlling a speed of rotation of the second motorization means of the second pump in order to ensure the calculated oil flow rate in the second circuit, or
the electronic control unit incorporating means for controlling the three-way valve in order to ensure the calculated oil flow rate in the second circuit to the aeronautical engine and the calculated oil flow rate in the first circuit to the reduction gearbox.

9. A turbomachine as an aeronautical engine comprising an assembly of an electronic control unit and a lubrication system according to claim 8.

10. A method for regulating a flow rate of lubricating oil in a turbomachine according to claim 9, wherein the method performed a calculation of the respective flow rates to the aeronautical engine and the reduction gearbox, the method implementing laws for controlling the variable-section jet pump and, where appropriate, the three-way valve so that the actual flow rates to the aeronautical engine and the reduction gearbox are respectively equal to the respective calculated flow rates.

\* \* \* \* \*